(12) United States Patent
Urbonaite-Zuke et al.

(10) Patent No.: US 12,376,616 B2
(45) Date of Patent: Aug. 5, 2025

(54) PROTEIN COMPOSITIONS WITH HIGH ISOELECTRIC PROTEINS

(71) Applicant: N.V. Nutricia, Zoetermeer (NL)

(72) Inventors: Vaida Urbonaite-Zuke, Utrecht (NL); Aveenash Bala, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 623 days.

(21) Appl. No.: 17/415,740

(22) PCT Filed: Dec. 19, 2019

(86) PCT No.: PCT/NL2019/050855
§ 371 (c)(1),
(2) Date: Jun. 18, 2021

(87) PCT Pub. No.: WO2020/130821
PCT Pub. Date: Jun. 25, 2020

(65) Prior Publication Data
US 2021/0378279 A1    Dec. 9, 2021

(30) Foreign Application Priority Data

Dec. 21, 2018   (WO) ................ PCT/NL2018/050883

(51) Int. Cl.
*A23L 33/185* (2016.01)
*A23C 9/12* (2006.01)
(Continued)

(52) U.S. Cl.
CPC ............ *A23L 33/19* (2016.08); *A23C 9/1216* (2013.01); *A23C 11/06* (2013.01); *A23C 21/04* (2013.01);
(Continued)

(58) Field of Classification Search
CPC ........ A23L 33/19; A23L 33/40; A23L 33/185; A23L 33/17; A23L 29/06;
(Continued)

(56) References Cited

U.S. PATENT DOCUMENTS 3,338,719 A * 8/1967 Sawada ................ A23C 9/1216
426/42
5,436,020 A * 7/1995 Kuwata .................. A23J 1/205
426/583

(Continued)

FOREIGN PATENT DOCUMENTS

AU  2007216827 B2   2/2012
CN     108813632 A  11/2018

(Continued)

OTHER PUBLICATIONS

Chiu et al, Direct Purification of Lysozyme from Chicken Egg White Using Weak Acidic Polyacrylonitrile Nanofiber-Based membranes, https://onlinelibrary.wiley.com/doi/epdf/10.1002/app.36764 (Year: 2012).*

(Continued)

*Primary Examiner* — Drew E Becker
(74) *Attorney, Agent, or Firm* — N.V. Nederlandsch Octrooibureau

(57) ABSTRACT

The present invention is in the field of protein compositions, in particular protein compositions for infant milk formula. The protein compositions according to the invention comprise whey protein, casein and high isoelectric point proteins, such as those having an isoelectric point of at least 6.0.

(Continued)

Figure 1:
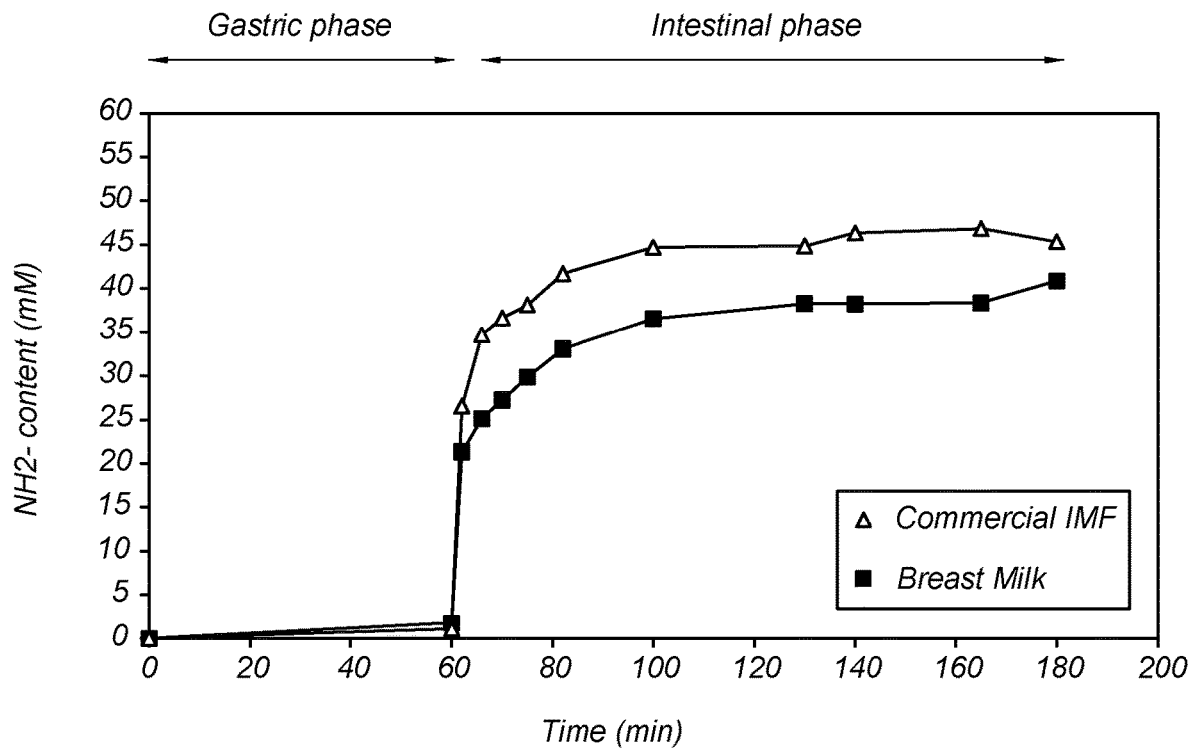

The present invention further relates to the uses of the protein compositions.

14 Claims, 2 Drawing Sheets

(51) Int. Cl.
| | |
|---|---|
| A23C 11/06 | (2006.01) |
| A23C 21/04 | (2006.01) |
| A23C 21/06 | (2006.01) |
| A23C 21/08 | (2006.01) |
| A23L 29/00 | (2016.01) |
| A23L 33/00 | (2016.01) |
| A23L 33/19 | (2016.01) |

(52) U.S. Cl.
CPC .............. *A23C 21/06* (2013.01); *A23C 21/08* (2013.01); *A23L 29/06* (2016.08); *A23L 33/185* (2016.08); *A23L 33/40* (2016.08); *A23V 2250/54242* (2013.01); *A23V 2250/54244* (2013.01); *A23V 2250/54246* (2013.01); *A23V 2250/54252* (2013.01); *A23V 2250/5428* (2013.01); *A23V 2250/548* (2013.01)

(58) Field of Classification Search
CPC ........................ A23V 2250/5424–5428; A23V 2250/548–5488; A23C 9/1512; A23C 11/02; A23C 11/06; A23C 21/04; A23C 21/06; A23C 21/08; A23C 9/1203–1216
See application file for complete search history.

(56) References Cited

U.S. PATENT DOCUMENTS

| | | | |
|---|---|---|---|
| 6,190,724 B1 | 2/2001 | Sawatzki | |
| 8,580,316 B2 | 11/2013 | Boehm et al. | |
| 11,154,081 B1* | 10/2021 | Lele | A23P 10/40 |
| 2005/0175622 A1* | 8/2005 | Edens | A23L 33/19 |
| | | | 424/184.1 |
| 2006/0286086 A1* | 12/2006 | Ferrari | A23L 29/06 |
| | | | 424/94.61 |
| 2007/0092629 A1* | 4/2007 | Scanlin | A61Q 19/00 |
| | | | 530/370 |
| 2010/0233318 A1* | 9/2010 | Edens | A23C 21/02 |
| | | | 426/583 |
| 2012/0135103 A1* | 5/2012 | Walsh | A23L 33/40 |
| | | | 426/2 |
| 2012/0171164 A1 | 7/2012 | Wittke et al. | |
| 2012/0269929 A1* | 10/2012 | Lippman | A23L 33/12 |
| | | | 426/71 |
| 2013/0089572 A1* | 4/2013 | Vanderhoof | A61P 37/00 |
| | | | 424/275.1 |
| 2013/0129707 A1* | 5/2013 | Murata | A23K 50/40 |
| | | | 424/94.6 |
| 2015/0305359 A1* | 10/2015 | Ao | A23L 11/60 |
| | | | 426/2 |
| 2017/0099852 A1 | 4/2017 | Nono et al. | |
| 2019/0069589 A1* | 3/2019 | Smulders | A23L 2/52 |
| 2019/0216106 A1* | 7/2019 | Geistlinger | A23C 19/093 |
| 2020/0260773 A1* | 8/2020 | Ao | A23C 9/1526 |
| 2020/0359650 A1* | 11/2020 | Shi | A23J 1/202 |
| 2021/0161172 A1* | 6/2021 | Gee | C07K 19/00 |
| 2022/0000161 A1* | 1/2022 | Cakir-Fuller | A23L 2/66 |
| 2022/0071899 A1* | 3/2022 | Jaecklein | A61K 38/1709 |
| 2024/0196949 A1* | 6/2024 | Kapeleris | A23L 33/40 |

FOREIGN PATENT DOCUMENTS

| | | |
|---|---|---|
| EP | 2441443 A1 | 4/2012 |
| WO | 99/15024 A1 | 4/1999 |
| WO | 2005/017168 A1 | 2/2005 |
| WO | WO-2016174651 A2 * | 11/2016 ............... A23L 2/52 |
| WO | 2018/039632 A1 | 3/2018 |

OTHER PUBLICATIONS

Translation of CN 105746713A (Year: 2016).*
Satoru Oshima et al.: Efficacy of Organic Acids, Bacteriocins, and the Lactoperoxidase System in Inhibiting the Growth of *Cronobacter* spp. in Rehydrated Infant Formula, Journal of Food Protection, vol. 75, No. 10, Oct. 1, 2012 (Oct. 1, 2012), pp. 1734-1742, XP055623410, US, ISSN: 0362-028X, DOI: 10.4315/0362-028X.JFP-12-066.
Database FSTA [Online], International Food Information Service (IFIS), Frankfurt-Main, DE; Ming-Jiang Zhang et al.: "Development of a new lysozyme adding technology in infant formula", XP002794350, Database accession No. FS-2009-11-Pn2924, Date NA.
S A Al-Mashdchi et al.: "Separation of Ovotransferrin from Egg White by Immobilized Metal Affinity Chromatography", Agric. Biol. Chem, Jan. 1, 1987 (Jan. 1, 1987), pp. 2881-2887, XP055623241, Retrieved from the Internet: URL:https://www.j stage.jst.go.jp/article/bbbl961/51/11/51_II_2881/_pdf, pp. 2881, 28.
Wu Jianping et al.: "Ovotransferrin: Structure, bioactivities, and preparation", Food Research International, vol. 46, No. 2, 2012, pp. 480-487, XP028905410, ISSN: 0963-9969, DOI: 10.1016/J.FOODRES.2011.07.012, p. 480; table 1.
Hans Demmelmair et al.: Benefits of Lactoferrin, Osteopontin and Milk Fat Globule Membranes for Infants, Nutrients, vol. 9, No. 8. Jul. 28, 2017 (Jul. 28, 2017), pp. 1-22, XP055616883, DOI: 10.3390/nu9080817 paragraph [02.5]; table 1.
Mattias Fredrikson et al: Production Process for High-Quality Pea-Protein Isolate with Low Content of Oligosaccharides and Phytate, Journal of Agricultural and Food Chemistry, vol. 49, No. 3, Jan. 31, 2001 (Jan. 31, 2001), pp. 1208-1212, XP055492587, US, ISSN: 0021-8561, DOI: 10.1021/jf000708x.
Nguyen: Digestibility and structural changes of ingredients in infant formulae during the gastrointestinal digestion, PhD thesis, The University of Queensland, School of Agriculture and Food Sciences—published: 2017.
Martin et al.: Review of Infant Feeding: Key Features of Breast Milk and Infant Formulae. Nutrients 2016, 8, 279—published: 2016.
Lonnerdal: Infant formula and infant nutrition: bioactive proteins of human milk and implications for composition of infant formulas. Am J Clin Nutr 2014; 99 (suppl): 712S-7S—published: 2014.
Maathuis et al.: Protein Digestion and Quality of Goat and Cow Milk Infant Formula and Human Milk Under Simulated Infant Conditions. JPGN 2017: 65:6, 661-666—published: 2017.
Aly et al.: Supplementation of infant formulas with recombinant human lactoferrin and/or galactooligosaccharides increases iron bioaccessibility as measured by ferritin formed in Caco-2 cell model. Food Research International, 89, 1048-1055—published: 2016.
Brock: Lactoferrin in human milk: its role in iron absorption and protection against enteric infection in the newborn infant. Archives of Disease in Childhood, 1980, 55, 417-421—published: 1980.
Panfil-Kuncewicz et al.: Influence of lysozyme on the enzymatic coagulation of milk. Acta Alimentaria Polonica. Vol. XIV (XXXVIII), No. 3-4, 145-152—published: 1988.
Dairy UK: Milk—Nutrition information for all the family—published: Jan. 2018.
Panfil-Kuncewicz et al.: Influence of lysozyme on changes in size of casein micelles in milk. Acta Alimentaria Polonica, vol. XIV (XXXVIII), No. 3-4, 153-161—published: 1988.
Anema et al.: Interaction of Lactoferrin and Lysozyme with Casein Micelles. Biomacromolecules 12, 3970-3976—published: 2011.
Product Bulletin: Skimmilk powder—Regular, Low Heat, GDT Specification, Fonterra New Zealand—Version Feb. 5, 2024—published: 2024.
Thompson et al.: Nomenclature of the proteins of cow's milk—second revision. Report of the Committee on Milk Protein Nomen-

(56) References Cited

OTHER PUBLICATIONS clature, Classification, and Methodology of the Manufacturing Section of ADSA for 1963-64—published: 1964.
Demmelmair et al.: Benefits of Lactoferrin, Osteopontin and Milk Fat Globule Membranes for Infants. Nutrients 2017, 9, 817—published: 2017.
Lonnerdal: Nutritional and physiologic significance of human milk proteins. Am J Clin Nutr 2003: 77 (suppl): 1537S-43S—published: 2003.
Brand et al.: A novel approach for lysozyme and ovotransferrin fractionation from egg white by radial flow membrane adsorption chromatography: Impact of product and process variables. Separation and Purification Technology 161 (2016) 44-52—published: 2016.
Dupont: Protein requirements during the first year of life. Am J Clin Nutr 2003; 77 (suppl): 1544S-9S—published: 2003.
Dallas et al.: Digestion of Protein in Premature and Term Infants. Nutr Disorders Ther 2012, 2, 3—published 2012.
Del Giacco et al.: Total IgE in newborns treated prophylactically with conalbumin. Int. J. Tiss. Reac. VII (6) 535-537—published 1985.
Hay Jr. et al.: Preterm formula use in the preterm very low birth weight infant. Seminars in Fetal & Neonatal Medicine 22 (2017) 15-22—published: 2017.
Wanasundara et al.: Canola/rapeseed protein-functionality and nutrition. Ocl, Edp Sciences, 2016.
Bethell, "Generally Recognized as safe (GRAS) notification for lysozyme (human) from rice for use as an ingredient in infant and pre-term formulas and in pediatric medical foods". GRAS notification submitted with the FDA, published 2006.
Excerpt from Mintel; "Stage 1 Baby Formula" from Namyang Dairy Products, published Mar. 2018.
Newburg, "Bioactive components of human milk", 2001, pp. 15 and 241.
Guo, "Human Milk Biochemistry and Infant formula Manufacturing Technology", 2014, p. 20.
Packard, "Human milk and infant formula", 1982, pp. 83-86.
Parry et al., "Isolation and Characterization of human milk lysozyme", Arch Biochem and Biophys, 1969, 103, pp. 59-65.
Gonzalez-Chavez et al., "Lactoferrin : structure, function and applications", Int J Antim Agents, 2009, 33, pp. 301. e1-301.e8.
Anema, "Spontaneous interaction of lactoferrin with casein micelles or individual caseins"—2018.
Kailasapathy 2015. Chemical Composition, Physical, and Functional Properties of Milk and Milk Ingredients. In Dairy Processing and Quality Assurance (eds R.C. Chandan, A. Kilara and N.P. Shah).
Pang, Z. et al., "Evaluation of tilapia skin gelatin as a mammalian gelatin replacer in acid milk gels and low-fat stirred yogurt"—2017.
Schorsch, C., et al., "Cross-linking casein micelles by a microbial transglutaminase conditions for formation of transglutaminase-induced gels"—2000.
Organic Chemistry 4th ed—2000.
Commission Delegated Regulation (EU) 2016/127.

\* cited by examiner

PROTEIN COMPOSITIONS WITH HIGH ISOELECTRIC PROTEINS

FIELD OF THE INVENTION

The invention is in the field of protein compositions. Particularly, the invention concerns protein compositions comprising high isoelectric proteins suitable for use in infant milk formulae, as well as infant milk formulae comprising the protein compositions of the invention and uses thereof for improving digestibility and/or preventing/treating conditions associated with sub-optimal or impaired digestibility in infants and/or toddlers.

BACKGROUND OF THE INVENTION

The human milk is the golden standard for infant and young children nutrition. However, breast milk is not always an available option. When this is the case, infant formula is the first choice for human milk replacement and supports adequate growth of infants when fed as a sole or combined source of nutrition. Human milk is a complex matrix of components having unique molecular structure and biological function that are not easy to be replicated in infant formula, especially considering the heat treatments the product must undergo to ensure its safety and stability through long-term storage.

Although cow's milk is a valuable source of components for the infant milk industry, it considerably differs from human milk in terms of protein content and concentration. The complex proteins structure and their interactions in human milk are believed to be intrinsically connected to the health benefits of human milk in infants, which is therefore hard to be replicated in infant formulas.

Protein digestion occurs in two phases: gastric and intestinal. In the stomach (pH around 6.5-3.0), pepsin partially breakdowns proteins into large polypeptides and oligopeptides. After a certain period in the stomach, the gastric content is emptied and proceeds to the intestinal phase. In the intestine (pH around 6.6), trypsin and peptidases will hydrolyze the polypeptides into tri-, dipeptides and free amino acids which are small enough to be transported through the cells to the bloodstream.

Ideally, digestibility of infant milk formulae should be comparable to digestibility of human milk, since the latter is the golden standard for human nutrition and development. However, digestibility in formula fed or cow's milk fed infants is known to differ from human milk fed infants: human milk digestibility is considerably lower than digestibility of currently available standard infant milk formulae, which results in postprandial amino acid appearance in the blood is faster with infant formula than with breast milk (Moro et al. "*Postprandial plasma amino acids in preterm infants: influence of the protein source*" Act. Paediatr. 1999, 88(8):885-889).

It is desirable to mimic the lower digestibility profile of human milk as it is believed that lower protein digestibility promotes adequate gastrointestinal tract development and nutrient absorption in infants. Slowly absorbed proteins promote postprandial protein deposition, whereas rapidly absorbed proteins as in commercially available standard milk formula stimulate amino acid oxidation, ultimately affecting tissue development in infants. It is further believed that the lower digestibility of human milk in infants/toddlers promotes adequate supply of proteins, peptides and amino acids in specific sections of the gastrointestinal tract which are responsible to signalize for the morphological and functional development of the intestinal section concerned. Moreover, consequences of a sub-optimal or deficient development of intestinal functions or nutrient absorption in formula fed infants are not only immediate but can also persist into adulthood creating basis for increased susceptibility to a number of diseases and conditions, such as obesity, reduced immunity, etc.

Attempts to modulate infant's digestion have been made.

WO 2012/045801 describes compositions containing a complex coacervate which comprises lactoferrin and at least one other protein with an isoelectric point lower than pH 7.0. Methods of preparing these protein-protein complexes are described. The complex coacervates are said to be stable and easy to be incorporated into food products. In the examples, the preparation of the coacervates is described, and in vitro digestion of protein solutions comprising the coacervates are tested.

U.S. Pat. No. 6,190,724 B1 describes compositions comprising modified proteins and methods for modifying proteins. The methods include 1) polymerization and/or cross-linking, 2) inclusion of certain amino acids, 3) glycosylation, 4) dephosphorylation or 5) partial or total thermal rearrangement of proteins. The modified proteins are used in infant formulae, in an amount of at least 15 wt. % of the total proteins. The modified proteins are described to alter the digestion kinetics (i.e. to slow it down).

There remains a need for improving digestibility of milk formulas for infants and young children and to have the nutrients absorption profile mimic that of human milk.

SUMMARY OF THE INVENTION

Protein compositions for standard infant milk formulae typically comprise casein and whey protein, such as from cow's milk. The standard infant milk formulae have a higher digestibility than breast milk, which is undesirable. Reference is herein made to FIG. 1.

The inventors have found that the inclusion of substantive amounts of high isoelectric point (pI) protein(s) in compositions comprising casein and whey protein surprisingly lowers the protein digestibility profile, as compared to compositions currently used in standard infant formulae, i.e. without such high pI proteins. As used herein, 'low'/'lower' digestibility does not imply that proteins are digested to a lesser extent or not digested in in-vivo situation, but rather that proteins are digested slower. The protein compositions according to the invention thus allow formulating infant milk formulae exhibiting a digestibility profile that more closely resembles that of human breast milk (that is, lower than the digestibility of standard infant milk formula).

With human breast milk being the gold standard, the protein compositions thus yield improved protein digestibility. Thus, 'improved' protein digestibility refers to a low/lower protein digestibility (for instance, as breast milk has a 'low/lower' digestibility than the reference formula in FIG. 1).

Accordingly, in a first aspect, the invention refers to a protein composition for an infant milk formula, the protein composition comprising casein, whey protein and at least one non-dairy high isoelectric protein (i.e. a high isoelectric protein of non-dairy source) having an isoelectric point of between 6.0 and 11, wherein the weight ratio of the sum of casein and whey protein to the non-dairy high-isoelectric protein is between 95:5 and 75:25.

According to a second aspect, the invention relates to a protein composition suitable for an infant milk formula, the composition comprising casein and whey protein in a weight ratio between 40:60 and 55:45, the composition comprising 10 to 40 wt. %, based on the total protein content, of at least one high isoelectric protein having an isoelectric point of between 6.0 and 11.

In a third aspect, the invention relates to an infant milk formula comprising the protein composition of the present invention. The infant milk formula is suitable for administration to infants with an age between 0 and 36 months.

Without wishing to be bound by theory, it is hypothesized that the electrostatic interactions and/or the protein structure of the high isoelectric proteins advantageously reduce digestibility of the entire protein composition. Lower digestibility, such as in breast fed infants, advantageously translates to optimal morphological and functional development of infant's intestinal sections, reduced amino acid oxidation, promotion of amino acid deposition, and improved tissue development.

Accordingly, the present invention also concerns an infant formula for improving nutrient absorption, for promoting amino acids deposition and for promoting tissue development in infants, particularly in infants in need thereof, such as premature infants.

Clauses

1. A protein composition suitable for an infant milk formula, the composition comprising casein, whey protein and at least one high isoelectric protein from a non-dairy source, said high isoelectric protein having an isoelectric point of between 6.0 and 11, wherein the weight ratio of the sum of casein and whey protein to the high-isoelectric protein in the composition is between 95:5 and 75:25.

2. The protein composition according to clause 1, wherein the casein and whey protein are present in a weight ratio between 30:70 and 70:30, preferably between 38:62 and 62:38, more preferably about 50:50 or about 40:60.

3. The protein composition according to clause 1 or 2, wherein the casein comprises β-caseins in an amount of between 35 and 60 wt. % of total casein content.

4. The protein composition according to any previous clause, wherein the casein comprises α-caseins in an amount of between 20 and 60 wt. % of total casein content.

5. The protein composition according to any previous clause, wherein the casein comprises k-caseins in an amount of between 15 and 30 wt. % of total casein content.

6. The protein composition according to any previous clause, wherein the whey protein comprises α-lactalbumin in an amount of between 20 and 80 wt. % of total whey protein content.

7. The protein composition according to any previous clause, wherein the whey protein comprises β-lactoglobulin in an amount of between 20 and 70 wt. % of total whey protein content.

8. The protein composition according to any previous clause, wherein the high isoelectric protein is one or more proteins selected from the group consisting of lysozyme, ovotransferrin, canola protein, rapeseed protein, or mixtures thereof.

9. A protein composition suitable for an infant milk formula, the composition comprising casein and whey protein in a weight ratio between 40:60 and 55:45, the composition comprising 10 to 40 wt. %, based on the total protein content, of at least one high isoelectric protein having an isoelectric point of between 6.0 and 10. The protein composition according to clause 9, wherein the at least one high isoelectric protein is present in an amount of 15 to 35 wt. %, preferably 18 to 30 wt. %, based on total protein content.

11. The protein composition according to clause 9 or 10, wherein the at least one high isoelectric protein is selected from lactoferrin, lysozyme, ovotransferrin, canola protein, rapeseed protein, or mixtures thereof, preferably lactoferrin, lysozyme, ovotransferrin or mixtures thereof, most preferably lactoferrin.

12. The protein composition according to any previous clause, wherein the at least one high isoelectric protein is in intact form.

13. The protein composition according to any previous clause, wherein only one high isoelectric protein having an isoelectric point between 9.0 and 11 is present.

14. The protein composition according to any of clauses 1-12, wherein two high isoelectric proteins having an isoelectric point between 6.0 and 11 are present, wherein one of the isoelectric proteins has an isoelectric point between 9.0 and 11.

15. The protein composition according to any one of the preceding clauses, consisting of casein, whey protein and at least one high isoelectric protein, preferably one or two high isoelectric proteins, including one high isoelectric protein from a non-dairy source.

16. An infant milk formula comprising the protein composition as defined in any one of clauses 1 to 14, suitable for administration to an infant with an age between 0 and 36 months.

17. The protein composition according to any one of clauses 1 to 14, or the infant milk formula according to clause 15, for therapeutic use in improving digestibility, preferably protein digestibility, in a human infant suffering from or being at risk of suffering from impaired digestibility and/or immature tissue development and/or immature gastrointestinal development, preferably premature infants.

18. Use of the protein composition according to any one of clauses 1 to 14, or the infant milk formula according to clause 15, for improving protein digestibility in a healthy human infant, and/or for the promotion of tissue development in a healthy human infant.

19. A (non-therapeutic) method for improving digestibility, preferably protein digestibility, of a healthy human infant, wherein the infant is administered a protein composition according to any one of clauses 1 to 14, or an infant milk formula according to clause 15.

20. Use of the protein composition according to any one of clauses 1 to 14 in the manufacture of an infant milk formula for improving protein digestibility in a human infant, and/or the promotion of tissue development in a human infant.

DETAILED DESCRIPTION OF THE INVENTION

Protein Compositions

As used herein, 'protein compositions' refer to compositions comprising only proteinaceous material (peptides, amino acids, proteins), and preferably do not contain other components contributing to the caloric content of the composition, such as carbohydrates, fats and fibres. Expressed differently, the term 'protein composition' in the context of the invention does not encompass nutritional compositions comprising other nutrients, such as fats, carbohydrates etc.

Typically, the protein composition according to the invention has a pH in the range of 6.5 to 7.5.

The protein compositions according to the invention comprise casein and whey protein. The casein and whey protein preferably account for 65-95 wt % of the protein, more preferably 70-90 wt %, even more preferably 75-85 wt % of total weight of protein. In a preferred embodiment, the remainder of the protein is formed from non-dairy high-isoelectric protein as defined herein.

In one embodiment, the weight ratio of the sum of casein and whey protein to the at least one high-isoelectric protein is preferably between 95:5 and 75:25, more preferably 90:10-75:25, even more preferably 85:15-75:25.

Casein

Typically, in the protein composition according to the invention, casein is present in a weight ratio to whey proteins of between 25:75 and 70:30, more preferably 30:70 and 70:30, even more preferably between 38:62 and 62:38, most preferably about 50:50 or about 40:60. Even more preferably, is a casein to whey protein ratio between 25:75-62:38, preferably 30:70 to 55:45, most preferably 40:60 to 52:48.

Casein used in the present invention is preferably but not necessarily bovine casein. Typically, the casein is used in the form of casein micelles, such as obtained from skimmed milk powder. Casein micelles comprise alphaS1, alpha S2, beta- and kappa-caseins, which ratios may differ according to supplier. In a preferred embodiment, casein does not include caseinates and/or dissociated casein micelles.

In a preferred embodiment, the casein fraction is enriched in beta-caseins. Accordingly, in one embodiment, the protein compositions comprise beta-casein in an amount of 35 to 60 wt. %, preferably 38 to 55 wt. %, more preferably 40 to 50 wt. %, based on total casein content. For sake of comparison, conventionally, beta-casein is present in casein in amounts of approximately 33 wt. %.

In another preferred embodiment, the casein fraction is enriched in kappa-casein. Accordingly, in one embodiment, the protein compositions comprise a casein fraction comprising kappa-casein of between 15 and 30 wt. % of the total casein content, preferably 15 and 28 wt. %, more preferably 18 and 25 wt % of total casein content. Preferably, kappa-casein does not account for more than 40 wt. % of the sum of alpha-, beta- and kappa-caseins, more preferably not more than 35 wt. %, even more preferably not more than 30 wt. %; but not less than 10 wt. %, more preferably not less than 15 wt. %, even more preferably not less than 20 wt. % of the sum of alpha, beta and kappa caseins. For sake of comparison, conventionally kappa-casein is present in casein in amounts of approximately 13 wt. %.

In a preferred embodiment, the sum of beta- and kappa-caseins in the casein fraction is between 50 and 80 wt % of the total casein content, preferably 60-75 wt % of the total casein content.

Typically, the protein composition comprises alpha-caseins in an amount to between 20 and 60 wt. %, preferably 25 and 55 wt. %, more preferably 30 and 50 wt. % of total casein content. Preferably, the sum of αS1-casein and αS2-casein represents not less than 20 wt. %, based on the sum of alpha, beta and kappa casein, preferably not less than 25 wt. %; but not more than 40 wt. %, based on the sum of alpha, beta and kappa casein, preferably not more than 35 wt. %.

As opposed to standard infant milk formulae commercially available, the infant formula of the invention may comprise beta-casein in excess relative to alpha-casein, preferably alphaS2-casein. Accordingly, in one embodiment, alpha-caseins are present in a ratio to beta-casein of at least 55:45.

Whey Protein

"Whey protein", also known in the art as "serum proteins", as used herein is meant to refer to major as well as minor whey proteins. "Major whey proteins" include alpha-lactalbumin and beta-lactoglobulins, depending on whey source. Preferably, the major whey proteins used in the present invention comprise both beta- and alpha-lactalbumin. "Minor whey proteins" are preferably selected from serum albumin, proteose peptone, immunoglobulins, lactoferrin and lysozyme. In the context of the invention, the terms 'whey' and 'whey protein' are used interchangeably, and refer to the protein component of whey.

Typically, whey proteins that may be included in the protein compositions of the invention include lactalbumins, beta-lactoglobulin, serum albumin, proteose peptone, immunoglobulins, lactoferrin, etc., all in accordance with its conventional meaning in the field.

Preferably, the whey protein of the composition of the invention is enriched in alpha-lactalbumin. Typically, α-lactalbumin is present in the protein composition in an amount of between 20 and 80 wt % of total whey content, more preferably 30 and 80 wt %, even more preferably 40 and 75 wt %, most preferably 45 and 70 wt %. Alpha-lactalbumin is suitably obtained as purified alpha-lactalbumin ingredients or whey protein concentrates enriched in alpha-lactalbumin. For sake of comparison, conventionally, whey protein comprises about 27 wt. % of alpha-lactalbumin.

The whey protein also comprises β-lactoglobulin. Preferably beta-lactoglobulin is present in an amount of between 20 and 70 wt % of total whey content, preferably 25 and 60 wt %, even more preferably 30 and 55 wt. %.

Preferably, the ratio of α-lactalbumin to β-lactoglobulin is from 1:1 to 6:1, more preferably from 2:1 to 5:1. It is believed that particularly better results are achieved in lowering digestibility, particularly of proteins, when the protein fraction of the invention comprises, α-lactalbumin in an amount of at least 20 wt. % of the total whey protein content. In a further preferred embodiment, better results in lowering digestibility, particularly of proteins, have been observed when the protein compositions of the invention comprise α-lactalbumin at an amount of at least 20 wt. % of the total whey protein content is combined with a casein fraction that is enriched in β-casein, i.e., in an amount of at least 28 wt. % of the total casein.

Some minor whey proteins, e.g. immunoglobulins and lactoferrin, may have an isoelectric point of at least 6.0. In one embodiment, the whey comprises a dairy protein having an isoelectric point between 6.0 and 11 in an amount of less than 0.2 wt. %, preferably less than 0.1 wt. %, even more preferably less than 0.05 wt. %, based on total protein content. In a more preferred embodiment said protein is lactoferrin. In an even more preferred embodiment, the infant formula comprises lactoferrin in an amount of less than 0.2 wt. %, preferably less than 0.1 wt. %, even more preferably less than 0.05 wt. %, based on total protein content. That is, in one embodiment, the infant formula of the invention non-dairy high isoelectric point proteins replace minor whey proteins, particularly the minor whey proteins selected from proteose peptone, immunoglobulins, lactoferrin.

In one embodiment, serum albumin is present in an amount of no more than 2 wt. % based on total whey content, preferably no more than 1 wt. %, more preferably no more than 0.1 wt. %.

High Isoelectric Point (pI) Protein(s)

The protein compositions according to the invention comprise at least one protein with high isoelectric point.

As used herein, a 'protein having high isoelectric point' is defined as a protein having an isoelectric point of 6.0 to 11, preferably at least 6.5, more preferably at least 7.0, even more preferably at least 7.5. The protein of high isoelectric point in the context of the invention is selected from a single high isoelectric protein or a mixture of at least two high isoelectric proteins (i.e., wherein each of the high isoelectric proteins have an isoelectric point of 6.0 to 11, preferably in the range of 7.0 to 10).

In one embodiment, the at least one high isoelectric point protein is of non-dairy origin. As used herein, 'non-dairy' or 'non-milk based' protein has the usual meaning that the protein has not been drawn or extracted from the mammary gland of a mammal.

Accordingly, in one aspect, the invention relates to a protein composition for an infant milk formula, the protein composition comprising casein, whey protein and at least one non-dairy high isoelectric protein having an isoelectric point of between 6.0 and 11, wherein the weight ratio of the sum of casein and whey to the non-dairy high-isoelectric protein is between 95:5 and 75:25.

Suitable examples of non-dairy high isoelectric proteins having a pI between 6.0 and 11 for use in the present invention include, but are not limited to, proteins extracted from eggs (e.g. lysozyme), pea, soy, canola, rapeseed, or combinations thereof.

Preferably, the at least one non-dairy high isoelectric proteins according to the invention are selected from ovotransferrin, lysozyme, rapeseed, or combinations thereof; more preferably ovotransferrin and lysozyme.

In another embodiment, the at least one high isoelectric point protein is a high-isoelectric protein of dairy origin, i.e., from a mammal. Suitable examples of dairy high-isoelectric proteins having a pI between 6.0 and 11 for use in the present invention include, for instance, immunoglobulins (pI from 5.5-8.3), lactoferrin (pI about 8.9) and lysozyme (pI about 10.4). Preferably, the at least one high isoelectric protein of a dairy source is selected from lactoferrin or lysozyme, more preferably lactoferrin.

Accordingly, in another aspect, the invention relates to a protein composition for an infant milk formula, the protein composition comprising casein and whey protein in a weight ratio between 40:60 and 55:45, the composition comprising 10 to 40 wt. %, based on the total protein content, of at least one high isoelectric protein having an isoelectric point of between 6.0 and 11. The high isoelectric protein can be a dairy high isoelectric protein, either alone or in combination with a non-dairy high isoelectric protein.

In yet another embodiment, the protein composition comprises a mixture of dairy and non-dairy high isoelectric proteins having a pI between 6.0 and 11. In that case, the dairy is preferably lactoferrin and the non-dairy is preferably selected from ovotransferrin, lysozyme and/or rapeseed.

The at least one high pI protein for use according to the invention is preferably selected from lactoferrin, lysozyme, ovotransferrin, canola protein, rapeseed protein, or mixtures thereof, preferably lactoferrin, lysozyme, ovotransferrin or mixtures thereof, most preferably lactoferrin.

Preferably, the at least one high isoelectric protein is present in the protein compositions in an amount of 15 to 35 wt. %, preferably 18 to 30 wt. %, based on total protein content.

According to one preferred embodiment, the protein compositions according to the invention comprise a single high isoelectric protein having an isoelectric point between 9.0 and 11. When used individually, the high isoelectric protein has an isoelectric point of at least 9.5, more preferably at least 10.0. Preferably, the high isoelectric is lysozyme, more preferably egg lysozyme. Suitable amounts of egg lysozyme, when used as sole high isoelectric protein, range from 15-30 wt. %, based on total protein content, more preferably 18-23 wt. %.

According to another preferred embodiment, the protein compositions according to the invention comprise multiple high pI proteins, such as mixtures of dairy and non-dairy high pI proteins in the prescribed amounts according to the invention i.e. added in excess to high pI proteins eventually in the whey fraction. In a preferred embodiment, more than two high isoelectric proteins having an isoelectric point between 6.0 and 11 are present, wherein at least 50% of the isoelectric proteins have an isoelectric point between 9.0 and 11. Even more preferably, two high pI proteins having an isoelectric point between 6.0 at 11 are present in the protein composition. Preferred combination of two high pI proteins is ovotransferrin and lysozyme.

Suitably, the two or more high pI proteins are present in a ratio wherein the protein with higher pI is present in an amount of at least 50% more than the high pI protein having the lowest pI. Put differently, in a protein composition comprising two or more high pI proteins having a pI between 6.0 and 11, the high pI protein having the lowest pI preferably does not amount to more than 50% of the total high pI proteins, more preferably no more than 30%, even more preferably no more than 20%.

Typically, the protein composition of the invention comprises at least one high isoelectric protein in an amount of 5 to 35 wt %, based on total weight of proteins, more preferably 10 to 30 wt %, even more preferably 15 to 25 wt. % of total weight of proteins.

In one embodiment, the content of high isoelectric protein replaces part of the whey proteins, preferably minor whey proteins, more preferably minor whey proteins selected from proteose peptone, immunoglobulins and/or lactoferrin. Accordingly, the at least one high isoelectric protein as a 'minor whey protein' replacer is present in an amount of from 5 to 30 wt. %, even more preferably between 10 to 25 wt. %, most preferably 15 to 20 wt. %, based on total whey content. Preferably, the protein compositions of the invention comprise a high isoelectric proteins as a 'minor whey protein' replacer in an amount of 2.5 to 15 wt. %, preferably 5 to 10 wt %, based on total weight of protein.

The high-isoelectric proteins may be hydrolyzed, partially hydrolyzed or intact. Preferably, the high-isoelectric proteins are in intact form. The term "an intact protein" as used herein refers to any form of intact protein, including but not limited to a protein concentrate and/or a protein isolate, as well as other forms of intact proteins.

Based on final weight of infant milk formulae comprising either protein compositions according to the invention, the formula comprises from 5 to 25 wt. %, more preferably at least from 10 to 20 wt. %, based on dry weight of the formula, of a protein having an isoelectric point of between 6.0 and 11.

Preferably, upon reconstitution, the protein having an isoelectric point of between 6 and 11 is present in an amount of between 0.01 and 0.33 g/100 ml, more preferably 0.1 to 0.3 g/ml.

Infant Milk Formula

In one aspect of the invention, the protein compositions described therein are included in an infant formula product.

Accordingly, in one embodiment, the invention relates to an infant milk formula comprising a protein composition according to claim 1, i.e., a protein composition for an infant milk formula, the protein composition comprising casein, whey protein and at least one non-dairy high isoelectric protein having an isoelectric point of between 6.0 and 11, wherein the weight ratio of the sum of casein and whey to the non-dairy high-isoelectric protein is between 95:5 and 75:25.

In another embodiment, the invention relates to an infant milk formula comprising the protein composition according to claim 9, i.e., a protein composition for an infant milk formula, the protein composition comprising casein and whey protein in a weight ratio between 40:60 and 55:45, the composition comprising 10 to 40 wt. %, based on the total protein content, of at least one high isoelectric protein having an isoelectric point of between 6.0 and 11.

All limitations to the protein compositions as described before apply mutatis mutandis.

The term 'infant formula' is well-defined and controlled internationally and consistently by regulatory bodies. In particular, CODEX STAN 73—1981 "Standard For Infant Formula and Formulas For Special Medical Purposes Intended for Infants" is widely accepted. It recommends for nutritional value and formula composition, which require the prepared milk to contain per 100 ml not less than 60 kcal (250 kJ) and no more than 70 kcal (295 kJ) of energy. FDA and other regulatory bodies have set nutrient requirements in accordance therewith. The herein used "infant formula" and "infant milk formula" are interchangeable.

The infant formula according to the invention can be used as a nutritional composition, nutritional therapy, nutritional support, as a medical food, as a food for special medical purposes or as a nutritional supplement. The present infant formula is preferably an enteral (oral) composition. The infant formula is administered orally to, or intended to be administered orally to, a subject in need thereof, in particular to children and infants, including toddlers, preferably children up to 6 years of age, preferably infants or young children typically with an age of 0-36 months, more preferably infants 0-12 months of age, most preferably 0-6 months of age. Thus, in some embodiments, the present infant formula is an infant formula for infants with an age of 0-6 months, or a follow-on formula for infants of 6-12 months, or a young child formula (also referred to as growing-up milk) for toddlers with an age of between 12 and 36 months.

In order to meet the caloric requirements of the infant, the present infant formula preferably comprises 50 to 200 kcal/100 ml liquid, more preferably 60 to 90 kcal/100 ml liquid, even more preferably 60 to 75 kcal/100 ml liquid. This caloric density ensures an optimal ratio between water and calorie consumption. The osmolarity of the present infant formula is preferably between 150 and 420 mOsmol/l, more preferably 260 to 320 mOsmol/l. The low osmolarity aims to reduce the gastrointestinal stress.

Preferably, the present infant formula is in a liquid form, preferably with a viscosity below 35 mPa·s, more preferably below 10 mPa·s, even more preferably below 6 mPa·s as measured in a Brookfield viscometer at 20° C. at a shear rate of 100 s-1. Suitably, the present infant formula is in a powdered from, which preferably can be reconstituted with water to form a liquid, or in a liquid concentrate form, which should be diluted with water. When the present infant formula is in a liquid form, the preferred volume administered on a daily basis is in the range of about 80 to 2500 ml, more preferably about 450 to 1000 ml per day.

The infant formula of the invention is heat treated. The term "heat-treatment" herein refers to a treatment at an elevated temperature, aimed at increasing the shelf-life of infant formula. Examples of a heat-treatment include pasteurization, sterilization and UHT (ultra-heat-treatment or ultra-high-temperature processing).

Suitably, the formula of the invention is not or does not comprise mammal milk, in particular the formula of the invention is not or does not comprise human breast milk.

Other Components

The infant formula according to the invention may suitably comprise typical infant formula components at usual amounts. The infant formula may thus comprise at least one of proteins (other than casein, whey and the high isoelectric protein(s) as described herein), fatty acids (e.g. long chain polyunsaturated fatty acids), animal fat, vegetable oils or blends thereof as a fat fraction, digestible carbohydrate fraction (e.g. lactose), indigestible carbohydrate fractions and may comprise dietary fiber with prebiotic activity, probiotic bacteria, a vitamin-mineral mix, etc.

The infant formula according to the invention preferably comprises a lipid component, preferably a lipid component suitable for infant nutrition as known in the art. The lipid component of the present infant formula preferably provides 2.9 to 6.0 g, more preferably 4 to 6 g per 100 kcal of the composition. When in liquid form, the infant formula typically comprises 2.1 to 6.5 g lipid per 100 ml, more preferably 3.0 to 4.0 g per 100 ml. Based on dry weight the present infant formula preferably comprises 12.5 to 40 wt % lipid, more preferably 19 to 30 wt %.

The infant formula according to the invention may comprise further proteinaceous material, in addition to casein, whey and high isoelectric protein according to the invention. In the context of the present invention the additional "protein" or "proteinaceous material" or "protein equivalents" encompasses proteins, peptides, free amino acids and partially or extensively hydrolysed proteins. Preferably, the further proteinaceous material does not evoke an allergic reaction or is hypoallergenic, such as free amino acids, and hydrolysed protein. As a further protein component, the infant formula according to the present invention preferably comprises free amino acids, hydrolysed whey protein, preferably partially hydrolysed whey proteins.

The present infant formula preferably contains at least 50 wt % protein component derived from (non-human) milk, more preferably at least 90 wt %, based on dry weight of total protein.

The present infant formula preferably contains 5 to 20%, more preferably 7 to 16%, most preferably 7 to 12% protein, based on total calories. The present infant formula, when in liquid form, preferably contains 0.5 to 6.0 g, more preferably 0.8 to 3.0 g, even more preferably 1.0 to 2.5 g of protein per 100 ml. The present infant formula preferably comprises at least 7 wt %, more preferably at least 8 wt %, most preferably at least 9 or at least 10 wt % protein based on dry weight of the total infant formula. Preferably, the present infant formula comprises at most 40 wt %, more preferably at most 15 wt %, preferably at most 20 wt % of the protein composition, based on dry weight of the total infant formula.

The infant formula may comprise digestible carbohydrate (s). Typically, digestible carbohydrates that are known in the art to be suitable for use in infant nutritional compositions are used, for example selected from digestible polysaccharides (e.g. starch, maltodextrin), digestible monosaccharides (e.g. glucose, fructose), and digestible disaccharides (e.g. lactose, sucrose). Particularly suitable is lactose and/or maltodextrin.

The digestible carbohydrate component preferably comprises at least 60 wt % lactose based on total digestible carbohydrate, more preferably at least 75 wt %, even more preferably at least 90 wt % lactose based on total digestible carbohydrate.

Human Subjects

The formula of any aspect of the present invention is intended for a human infant. Suitably, the formula of any aspect of the present invention is intended for a human term infant and/or human preterm infant. Suitably, the present infant formula is for providing the daily nutritional requirements to a human infant, in particular for administration to, in particular for feeding, humans, in particular infants including toddlers. The human subjects or population targeted is preferably infants (0-12 months) and toddlers (up to 36 months), preferably infants and toddlers that are partially or exclusively fed with non-human milk. In the context of the invention, a "human term infant" is a human infant born after 37 weeks of gestation, preferably between 37-42 weeks of gestation. Accordingly, a "human preterm infant" is a human infant born before completing 37 weeks of gestation.

In one embodiment, the human infant or toddler is fed with the infant milk formula as well as with human milk. In another embodiment, the human infant or toddler is exclusively fed with infant milk formula.

Digestibility

In an ideal world, protein digestibility, in particular casein and whey protein digestibility in formula-fed infants is similar to that observed in breast milk-fed infants. However, human milk digestibility profile is considerably lower than commercial, standard infant milk formula digestibility. FIG. 1 shows a comparison between total NH2 appearance over time under intestinal digestion conditions of fresh human milk (represented as squares; used on the same day as collected) and a commercial infant formula (represented as triangles; commercial infant milk formula (IMF)) prepared according to the package instructions and reconstituted at 1.3% w/w protein.

As used herein, 'low'/'lower' protein digestibility does not imply that proteins are digested to a lesser extent or not digested in in-vivo situation, but rather that proteins are digested slower. Herein, "protein digestibility" refers to total protein digested in in-vitro static digestion model for infants at 3 h digestion.

The low human milk digestibility is beneficial for ensuring appropriate nutrients absorption in the intestinal phase, in particular appropriate protein breakdown and peptides and amino acids absorption for tissue development. A faster protein digestibility, such as in standard infant formula, results in postprandial amino acid appearance in the blood, stimulating amino acid oxidation and ultimately adversely affecting tissue development in infants.

It is further believed that the lower digestibility of human milk in infants/toddlers promotes adequate supply of proteins, peptides and amino acids in specific sections of the gastrointestinal tract which are responsible to signalize for the morphological and functional development of the intestinal section concerned.

Infants not fed the mother's milk will be more susceptible to the consequences of an impaired or suboptimal intestinal digestion of protein compositions. These consequences may be observed during early infancy (ie, a direct effect) or may be observed later in life. Moreover, consequences of a sub-optimal or deficient development of intestinal functions or nutrient absorption in formula fed infants are not only immediate but can also persist into adulthood creating basis for increased susceptibility to a number of diseases and conditions, such as obesity, reduced immunity, etc.

Abnormally fast digestibility affects nutrient absorption which may lead, ultimately, to delayed tissue development and growth in infants and impaired development of the intestinal functions. Impaired digestibility can be measured in vitro as percentage of digestion hydrolysis over time or preferably at a physiologically relevant time point.

Advantageously, the protein compositions according to the invention have a lower digestibility profile when compared to protein compositions used in commercial, standard infant formulae.

Impaired protein digestibility may lead to diseases and conditions related to infants' growth and development, in particular tissue development. This is particularly relevant in underweight infants or infants suffering from or at risk of suffering from diseases or conditions affecting the intestinal nutrient absorption. In those cases, it is particularly desirable that the protein compositions are slowly digested in order to ensure the optimal nutrients absorption and amino acid intake to the blood stream. Impaired or suboptimal protein digestibility may be prevented or treated by using the protein compositions according to the invention. Accordingly, in one aspect, the invention relates to the use of the protein compositions or infant milk formula described herein for therapeutic use in improving digestibility, preferably protein digestibility, in a human infant suffering from or being at risk of suffering from impaired digestibility and/or delayed tissue development and/or delayed gastrointestinal development. Premature infants may benefit especially as their gastrointestinal tract is characterized by being immature.

Associated with these above findings, the invention pertains to the protein composition and infant formula as defined herein for therapeutic use in improving digestibility, preferably protein digestibility, in a human infant suffering from or being at risk of suffering from impaired digestibility and/or retarded tissue development and/or retarded gastrointestinal development, or premature infants with immature tissue development, in particular immature tissues of the gastrointestinal tract. Worded differently, the invention pertains to the use of the protein composition and infant formula as defined herein for improving protein digestibility in a healthy human infant, and/or the promotion of tissue development in a healthy human infant. The invention also pertains to a (non-therapeutic) method for improving digestibility, preferably protein digestibility, of a healthy human infant, wherein the infant is administered a protein composition or infant formula as defined herein. Worded differently, the invention pertains to the use of the protein composition as defined herein in the manufacture of an infant milk formula for improving protein digestibility in a human infant, and/or the promotion of tissue development in a human infant. In the context of the invention, the terminology 'improving digestibility' means lowering digestibility compared to digestibility obtained for conventional infant formula, i.e. reducing the gap in terms of digestibility compared to the digestibility profile obtained for human milk. In one embodiment, such a conventional infant formula has a protein composition made from casein and whey protein with a casein:whey protein weight ratio of about 40:60 (such as demonstrated in example 1). Associated therewith, the use extends to the promotion of tissue development in a healthy human infant, and the improvement of protein, peptides and/or amino acids absorption in a healthy human infant.

The infant or toddler may suffer from or is at risk suffering from retarded growth or delayed tissue development. Preferably, the infant or toddlers is a preterm human infant or a term human infant, preferably a preterm or a term underweight human infant.

FIG. 1: shows a comparison between total NH2 appearance over time under intestinal digestion conditions of fresh human milk and a commercial infant formula.

Figure 2:
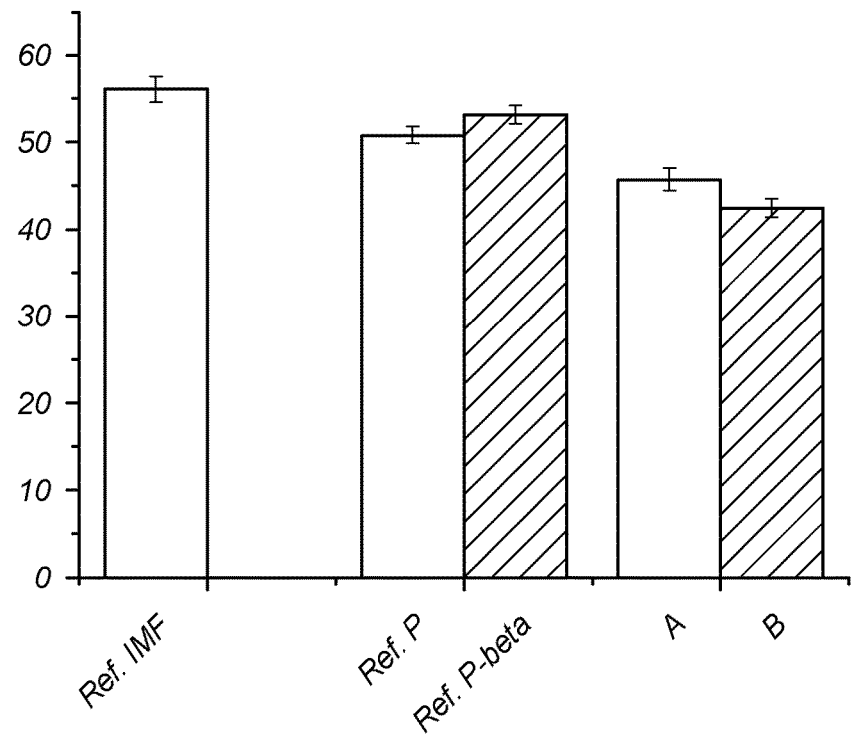
Figure 3:
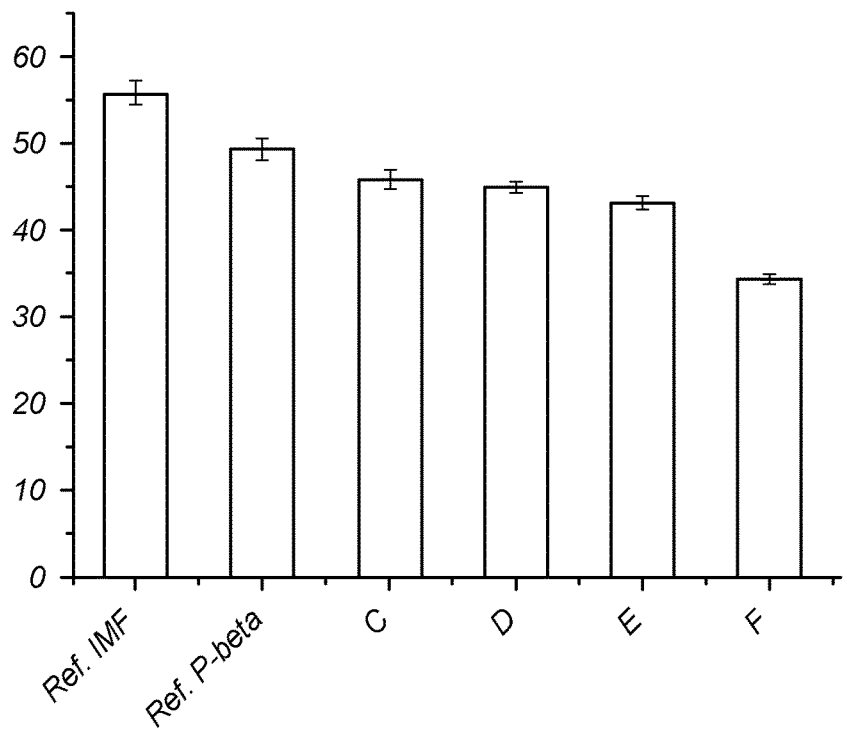
Figure 4:
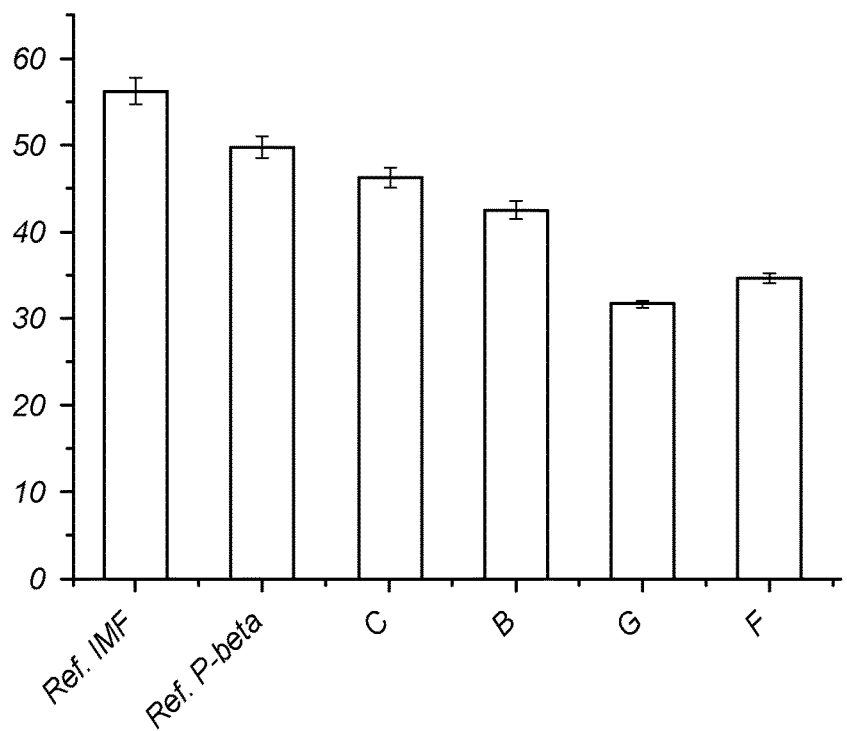

FIGS. 2, FIG. 3 and FIG. 4: show the protein digestibility of standard infant formula (Ref-IMF), formulations having casein and protein (50:50) (Ref-P and Ref-P-beta) and compositions A-G according to the invention under intestinal digestion conditions

EXAMPLES

Example 1

Protein Composition and Digestibility

Protein compositions as described in Table 1 were prepared as follows:

Whey proteins and/or high pI proteins were dissolved in demineralised water at room temperature under mild stirring for 2 h. Caseins were dispersed in 50° C. demineralized water and homogenized at 350+50 bar. Final protein formulations were obtained by mixing dissolved protein ingredients in appropriate ratios to reach final protein concentration of 1.3% (w/w). The amount of high pI proteins is expressed in weight percentage based on total proteins.

TABLE 1

| Protein composition | Components | Casein:whey weight ratio |
|---|---|---|
| Ref. IMF | Standard casein[1] Standard whey protein[2] | 40:60 |
| Ref. P | Standard casein[3] Standard whey protein[2] | 50:50 |
| Ref. P-beta | beta-casein enriched casein[5] Standard whey protein[2] | 50:50 |
| A | Standard casein[3] alpha-lactalbumin enriched whey protein[4] 15 wt. % ovotransferrin[6] 3 wt. % lysozyme[7] | 50:50 |
| B | beta-casein enriched casein[5] alpha-lactalbumin enriched whey protein[4] 15 wt. % ovotransferrin[6] 3 wt. % lysozyme[7] | 50:50 |

[1] skim milk powder (Omia)
[2] whey protein concentrate, 80% demineralized (Friesland Campina)
[3] micellar casein isolate (Friesland Campina)
[4] Lacprodan (Arla; amount of alpha-lactalbumin 60%)
[5] Ultranor HT (Kerry Foods; amount of beta-casein 40%)
[6] pI = 6.7, non-dairy source (Bioseutica Group)
[7] pI = 10.4, non-dairy source (Bioseutica Group)

Protein compositions of Table 1 were digested using static INFOGEST in vitro digestion model adapted for infants as shown in table 2 below:

TABLE 2

| Gastric phase (60 min) | Intestinal phase (120 min) |
|---|---|
| Ratio Meal: Simulated Gastric Fluid of 63:37 | Ratio Meal: Simulated Gastric Fluid of 39:61 |
| Enzymes: Pepsin (268 U/ml) and Lipase (19 U/ml) from Rabbit Gastric Extract | Enzymes: Porcine Pancreatin (lipase 90 U/ml) and Bovine bile (3.1 mM) |
| pH 4.5, T = 37° C. | pH 6.6, T = 37° C. |

Digestions of 100 ml volumes were performed in 250 ml Duran bottles. A water bath (MixBathPC, 2mag Magnetic Notion) and magnetic stirrer (Mixcontrol 40, 2mag Magnetic Notion) were set at 37.5° C. and 100 rpm, respectively. For the gastric phase, the protein solution set at 37° C. and a Simulated Gastric Fluid (SGF) were mixed in a ratio 63:37. The pH was adjusted to 4.5 using a 0.25 M HCl, gastric digesta was sampled at times 5, 15, 30 and 60 minutes. After the gastric phase, gastric digest was mixed with a Simulated Intestinal Fluid (SIF) in a ratio 39:61. The pH was adjusted to 6.6 using a 0.25 M NaOH/0.25 M NaHCO3. Intestinal digesta was sampled at times 2, 6, 10, 15, 22, 30, 40, 55, 70, 80, 90, 105 and 120 minutes.

Sampling was performed by mixing 1 ml digesta with 1 ml of 0.1 M phosphate buffer at pH 7.2 (gastric samples) or 5.5 (intestinal samples) to stop digestion, turraxed (T10 Basic Utraturrax, IKA) for 25 seconds at power 5.5 to enhance protein dispersibility, snap frozen in liquid nitrogen and stored at −20° C. until analysed. Each digestion was performed in triplicate.

Collected samples were subjected to analysis of generation of primary amino groups by ortho-phtaldialdehyde (OPA). The method is based on the specific reaction between OPA and free primary amino groups in proteins in the presence of 2-(dimethylamino)ethanethiol hydrochlorid (DMA) to give alkyl-iso-indole derivatives that show an absorbance at 340 nm. Digesta samples were mixed with 2% SDS at ratio 1:1, boiled at 95° C. for 5 minutes and left to cool down at room temperature. Aliquots of 5 μl was mixed with 200 μl of either OPA working reagent or OPA blank solution and incubated for 25 minutes. Signal was read using Biowave plate reader, the results were analysed using Gen5 2.09 software. Free NH2 groups were quantified using L-Alanine solution (0, 1, 2, 4, 6, 8 and 10 mM) calibration curve. Measurements were performed in duplicates.

Digestion results were expressed to degree of hydrolysis (%) as a function of time. Digestibility parameter was obtained by fitting data to equation as described previously (Deng, van der Veer et al. 2017), and are shown in FIG. 2.

Ref. IMF represents the protein digestibility profile of standard infant formula. Ref. P and Ref. P-beta are used as a reference to protein digestibility profile of formulations having casein and whey (50:50) without high pI proteins. Both Ref. P and Ref. P-beta present lower digestibility than Ref. IMF., regardless the casein source.

Improved digestibility (lower) is observed in compositions according to the invention (A, B), i.e., comprising high isoelectric point proteins, with even improved results when casein source is enriched in beta-casein.

Example 2

Comparison of High pI Protein

Composition B of Table 1 (18 wt. %, based on total protein, of proteins having pI of at least 6.0; 50:50 ratio of casein:whey; and using a beta-casein enriched casein source) was reproduced using different sources and ratios of high isoelectric point proteins. The compositions were prepared in the same manner as described in Example 1, and also had a final protein concentration of 1.3% (w/w).

TABLE 3

| Protein composition | Components (wt. % based on total proteins) |
|---|---|
| C | 18 wt. % ovotransferrin[1] |
| D | 18 wt. % lactoferrin[2] |
| E | 18 wt. % rapeseed protein[3] |

TABLE 3-continued

| Protein composition | Components (wt. % based on total proteins) |
|---|---|
| F | 18 wt. % lysozyme[4] |
| G | 9 wt. % ovotransferrin |
|   | 9 wt. % lysozyme |

[1]pI = 6.7 (Bioseutica Group)
[2]pI = 8.7 (FrieslandCampina)
[3]pI = 7-11 (Synthite Corporate)
[4]pI = 10.4 (Bioseutica Group)

The results are given in FIG. 3 (effect of single high pI proteins) and FIG. 4 (effect of two high pI proteins). FIG. 3 shows that the higher the pI of the protein used, the lower the protein digestibility. FIG. 4 shows that a composition with a 50:50 ratio of two high pI proteins presents a synergistic effect in lowering protein digestibility.

The invention claimed is:

1. A composition comprising casein, whey protein and at least one high isoelectric protein from a non-dairy source, said high isoelectric protein having an isoelectric point of between 6.0 and 11, wherein the weight ratio of the sum of casein and whey protein to the high-isoelectric protein in the composition is between 95:5 and 75:25, wherein the composition is an infant formula comprising 0.8-3.0 g/100 ml protein when in liquid form.

2. The composition according to claim 1, wherein the casein and whey protein are present in a weight ratio between 30:70 and 70:30.

3. The composition according to claim 1, wherein the casein comprises β-caseins in an amount of between 35 and 60 wt. % of total casein content; and/or wherein the casein comprises α-caseins in an amount of between 20 and 60 wt. % of total casein content; and/or wherein the casein comprises k-caseins in an amount of between 15 and 30 wt. % of total casein content.

4. The composition according to claim 1, wherein the whey protein comprises α-lactalbumin in an amount of between 20 and 80 wt. % of total whey protein content; and/or wherein the whey protein comprises β-lactoglobulin in an amount of between 20 and 70 wt. % of total whey protein content.

5. The composition according to claim 1, wherein the high isoelectric protein is one or more proteins selected from the group consisting of lysozyme, ovotransferrin, canola protein, rapeseed protein, or mixtures thereof.

6. The composition to according to claim 1, wherein the at least one high isoelectric protein is in intact form.

7. The composition according to claim 1, wherein only one high isoelectric protein having an isoelectric point between 9.0 and 11 is present.

8. The composition according to claim 1, wherein the composition comprises two high isoelectric proteins from a non-dairy source having an isoelectric point between 6.0 and 11, wherein one of the isoelectric proteins has an isoelectric point between 9.0 and 11.

9. The composition according to claim 1, consisting of casein, whey protein and at least one high isoelectric protein, including one high isoelectric protein from a non-dairy source.

10. A composition comprising casein, whey protein and at least one high isoelectric protein from a non-dairy source, said high isoelectric protein having an isoelectric point of between 6.0 and 11, wherein the weight ratio of the sum of casein and whey protein to the high-isoelectric protein in the composition is between 95:5 and 75:25, wherein the composition is an infant formula, wherein the infant formula comprises lipid, protein and digestible carbohydrates, with 5 to 20 energy % protein, based on total calories provided by the composition, and wherein the infant formula comprises 50 to 90 kcal/100 ml when in liquid form.

11. The composition according to claim 10, wherein the infant formula comprises 60 to 70 kcal/100 ml when in liquid form.

12. A composition comprising casein, whey protein and at least one high isoelectric protein from a non-dairy source, said high isoelectric protein having an isoelectric point of between 6.0 and 11, wherein the weight ratio of the sum of casein and whey protein to the high-isoelectric protein in the composition is between 95:5 and 75:25, wherein the composition is an infant formula in liquid form, comprising 0.8-3.0 g/100 ml protein.

13. A composition comprising casein, whey protein and at least one high isoelectric protein from a non-dairy source, said high isoelectric protein having an isoelectric point of between 6.0 and 11, wherein the weight ratio of the sum of casein and whey protein to the high-isoelectric protein in the composition is between 95:5 and 75:25, wherein the composition is an infant formula in liquid form, wherein the infant formula comprises lipid, protein and digestible carbohydrates, with 5 to 20 energy % protein, based on total calories provided by the composition, and wherein the infant formula comprises 50 to 90 kcal/100 ml when in liquid form.

14. The composition according to claim 13, wherein the infant formula comprises 60 to 70 kcal/100 ml liquid.

* * * * *